United States Patent
Kim et al.

(10) Patent No.: US 9,509,946 B2
(45) Date of Patent: Nov. 29, 2016

(54) CONFERENCE CALL TERMINAL AND METHOD FOR OPERATING USER INTERFACE THEREOF

(71) Applicant: Samsung Electronics Co., Ltd., Suwon-si, Gyeonggi-do (KR)

(72) Inventors: Geonsoo Kim, Suwon-si (KR); Hongseok Yang, Suwon-si (KR); Nagyeom Yoo, Yongin-si (KR); Hyungsuk Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 14/199,446

(22) Filed: Mar. 6, 2014

(65) Prior Publication Data
US 2014/0253669 A1 Sep. 11, 2014

(30) Foreign Application Priority Data
Mar. 8, 2013 (KR) .................. 10-2013-0025277

(51) Int. Cl.
*H04N 7/15* (2006.01)
*H04N 7/14* (2006.01)
*H04N 21/4788* (2011.01)

(52) U.S. Cl.
CPC ............. *H04N 7/141* (2013.01); *H04N 7/142* (2013.01); *H04N 21/4788* (2013.01)

(58) Field of Classification Search
None
See application file for complete search history.

(56) References Cited

U.S. PATENT DOCUMENTS

| 6,201,859 B1* | 3/2001 | Memhard et al. .......... 379/93.21 |
| 6,304,648 B1* | 10/2001 | Chang ..................... 379/202.01 |
| 8,863,187 B2* | 10/2014 | Ho ..................... H04N 5/44591 725/38 |
| 2002/0093531 A1* | 7/2002 | Barile .......................... 345/753 |
| 2005/0206659 A1* | 9/2005 | Cutler .................... G03B 37/00 345/660 |
| 2005/0243168 A1* | 11/2005 | Cutler ....................... 348/14.12 |
| 2007/0009028 A1* | 1/2007 | Lee et al. ................. 375/240.08 |
| 2007/0188596 A1 | 8/2007 | Kenoyer |
| 2007/0263076 A1 | 11/2007 | Andrews et al. |
| 2010/0053212 A1* | 3/2010 | Kang et al. .................... 345/629 |
| 2012/0050323 A1 | 3/2012 | Baron, Jr. et al. |
| 2012/0287218 A1 | 11/2012 | Ok |
| 2012/0307123 A1* | 12/2012 | Cok .................. H01L 27/14603 348/333.01 |
| 2014/0047487 A1* | 2/2014 | Guedalia .......... H04N 21/43615 725/80 |
| 2014/0218464 A1* | 8/2014 | Hartung et al. ........... 348/14.07 |

FOREIGN PATENT DOCUMENTS

KR 10-2010-0000547 A 1/2010

* cited by examiner

*Primary Examiner* — Creighton Smith
(74) *Attorney, Agent, or Firm* — Jefferson IP Law, LLP

(57) ABSTRACT

A method and an apparatus for operating a User Interface (UI) of a conference call terminal are provided. The method includes operating a first camera and a second camera when a conference call is initiated, outputting an output image of a conference call screen comprising a first image and a second image collected from the first camera and the second camera, the first image and the second image being arranged not to overlap, and distinguishing a speaking person's image from another person's image, when the speaking person's image is detected in the output image of the conference call screen.

15 Claims, 7 Drawing Sheets

FIG. 3
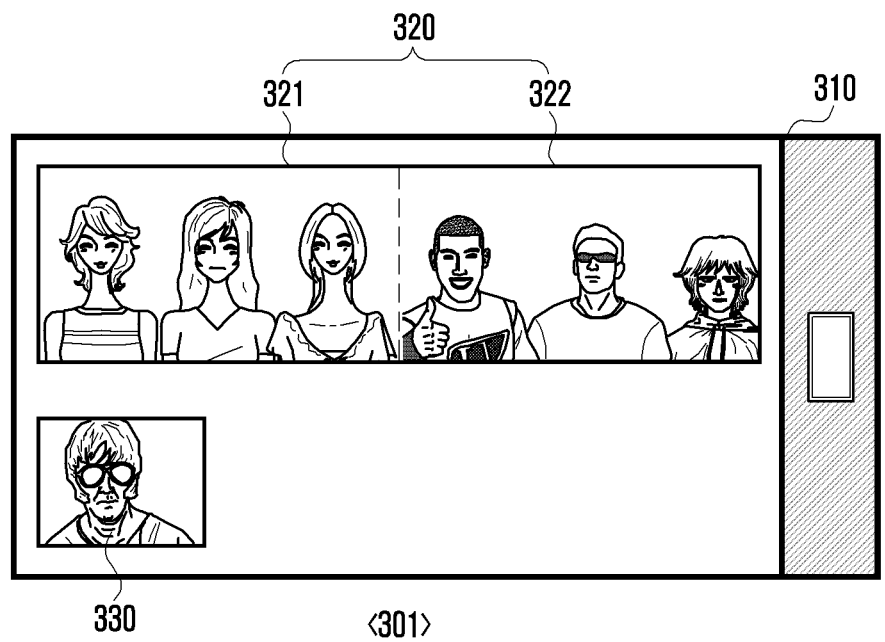
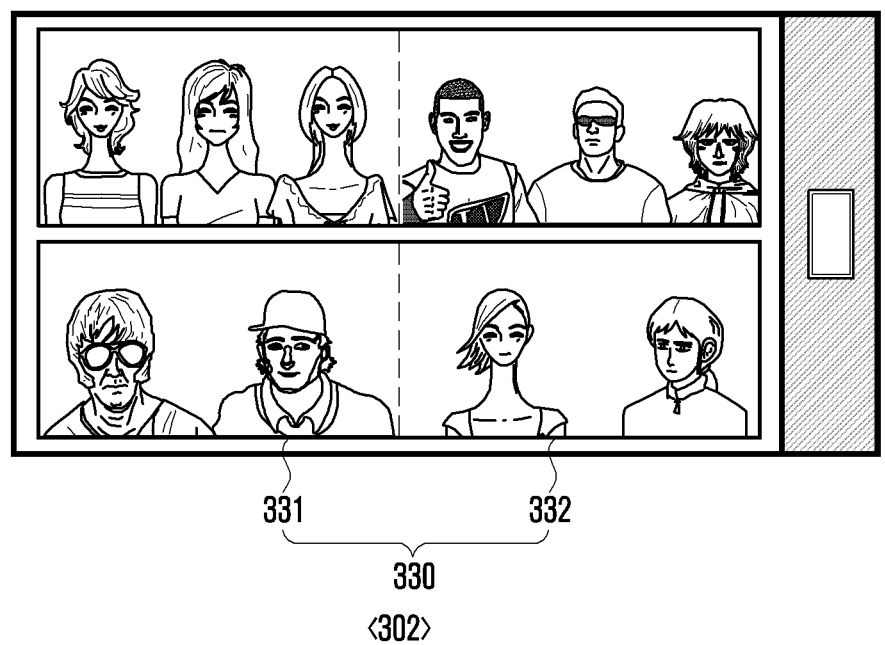

CONFERENCE CALL TERMINAL AND METHOD FOR OPERATING USER INTERFACE THEREOF

CROSS-REFERENCE TO RELATED APPLICATION(S)

This application claims the benefit under 35 U.S.C. §119 (a) of a Korean patent application filed on Mar. 8, 2013 in the Korean Intellectual Property Office and assigned Serial number 10-2013-0025277, the entire disclosure of which is hereby incorporated by reference.

TECHNICAL FIELD

The present disclosure relates to a method and an apparatus for operating a User Interface (UI) of a conference call terminal More particularly, the present disclosure relates to a conference call terminal having a dual camera and a method for operating a UI thereof.

BACKGROUND

As a communication technology has developed, portable terminals, (e.g., a smart phone and a tablet PC), have become increasingly widespread. The portable terminal provides integrated user functions by adding various new functions in addition to a voice call, a text call, and an image call service.

In particular, the image call service provides an image and audio between users at the same time, and, when transmitting an audio and image signal from a caller's mobile communication terminal to a receiver, the receiver may see and hear the caller's conversation by receiving the image and audio signal transmitted by the caller on the caller's own mobile terminal.

With the recent development in a mobile communication technology, and as the specifications of a mobile terminal have increased, the image call service may be used by many users. During the image call, by obtaining a user image input through a camera and a user's voice input through a microphone, the portable terminal may transmit the user image and the user's voice to the other party portable terminal, outputs the image received from the other party portable terminal to a display unit, and outputs the voice through a speaker. However, due to the limited size of a portable terminal, when performing the image call service, there is a problem in that is difficult for several people to participate in the image call at the same time by using a single portable terminal.

In general, a front camera disposed on a front of the portable terminal is used in the image call. That is, when performing the image call, a user who can be viewed through the camera is limited, because, only one camera, e.g., either a front camera or a rear camera is used. In order to call more than one person by using one portable terminal, a face of a caller should be output to a display unit through the camera by moving the portable terminal. In addition, even if the several users output on a small screen of the portable terminal by using a single camera, it is difficult to identify who the speaking person is.

Accordingly, there is a need for a conference call terminal that performs an image call with a plurality of people at the same time by operating a first and second camera in performing a conference call and a method for operating a User Interface (UI) thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a conference call terminal that performs an image call with a plurality of people at the same time by operating a first and second camera in performing a conference call and a method for operating a UI thereof.

Another aspect of the present disclosure is to provide a conference call terminal that distinguishes the people participating in conversation with the people who do not participate in conversation by recognizing a speaking person during the conference call and a method for operating a UI thereof.

In accordance with an aspect of the present disclosure, a method for operating a UI in a conference call terminal is provided. The method includes operating a first camera and a second camera when a conference call is initiated, outputting an output image of a conference call screen comprising a first image and a second image collected from the first camera and the second camera, the first image and the second image being arranged not to overlap, and distinguishing a speaking person's image from another person's image, when the speaking person's image is detected in the output image of the conference call screen.

In accordance with another aspect of the present disclosure, a conference call terminal is provided. The conference call terminal includes a first camera and a second camera configured to obtain and collect an image, an audio processing unit configured to collect and output an audio signal, a wireless communication unit configured to transmit and receive an image and a voice signal, a controller configured to collect a first image and a second image by operating a first camera and a second camera when a conference call is initiated, and configure an output image of a conference call screen comprising a first image and a second arranged not to overlap, and detect a speaking person from the output image of conference call screen, and a display unit configured to distinguish a speaking person's image detected from the conference call screen from another speaking person's image.

In accordance with another aspect of the present invention, a method of operating a user interface of a conference call terminal is provided. The method includes creating an output image comprising (i) a first image received from a first image device and a second image received from a second image device, the first image and the second image abutting each other on a first parallel plane, and (ii) another party image received from another conference call terminal on a second parallel plane, distinguishing an image of at least one person speaking in the output image from an image of at least one person being quiet, and outputting the output image on a conference call screen of the conference call terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates a conference call screen UI according to one embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A conference call terminal having dual cameras according to the present disclosure may be applied to a portable terminal. It is obvious that such a portable terminal may be all kinds of information communication devices having a camera and a communication function such as a mobile phone, a smart phone, a tablet PC, and a hand-held PC. In addition, a conference call apparatus according to the present disclosure may be equipped with a multi-tasking function that may perform several tasks simultaneously.

Hereinafter, it will be described with an assumption that the conference call terminal may correspond to a smart phone.

Figure 1:
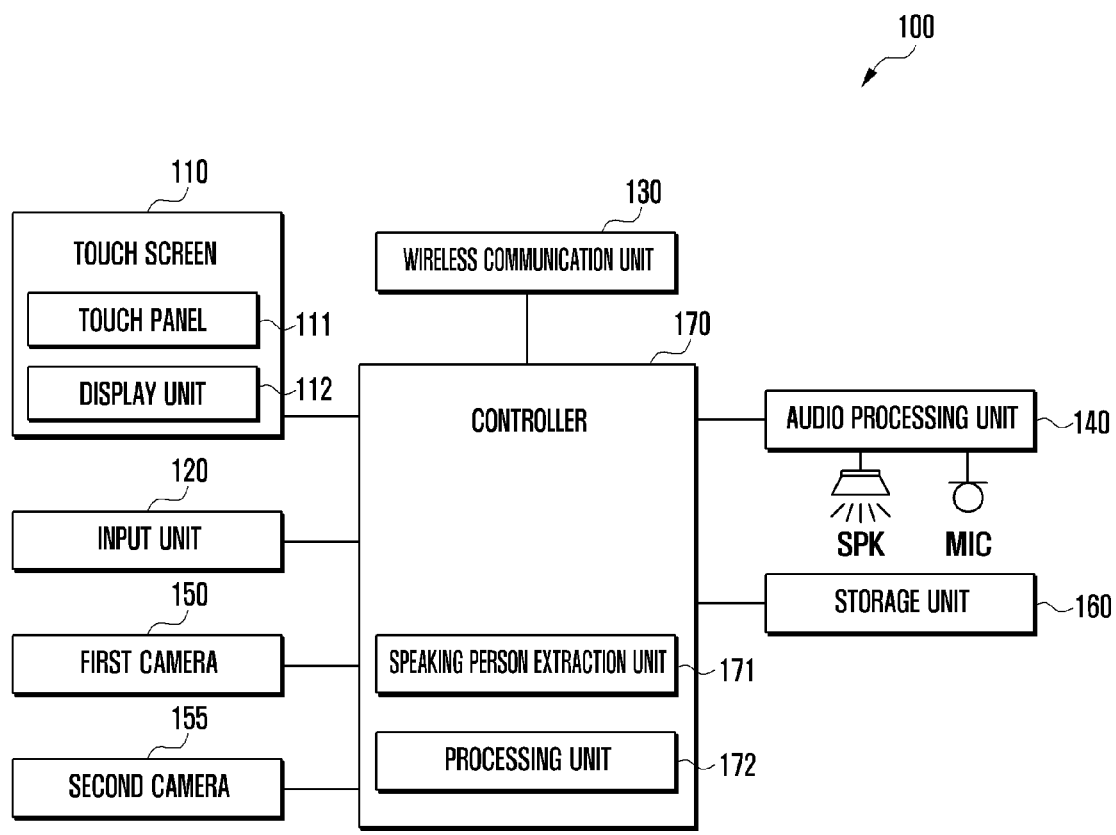
FIG. 1 is a block diagram illustrating a configuration of a conference call terminal according to an embodiment of the present disclosure.

FIG. 1 is a block diagram illustrating a configuration of a portable terminal according to an embodiment of the present disclosure.

Referring to FIG. 1, the portable terminal 100 according to the present disclosure may include a touch screen configured with a touch panel 111 and a display unit 112, a key input unit 120, a wireless communication unit 130, an audio processing unit 140, a first camera 150, a second camera 155, a storage unit 160, and a controller 170.

The touch screen 110 may include the touch panel 111 and the display unit 112. The touch screen may display a screen according to a user function execution, and may detect a touch event related to a user function control. The touch screen according to the present disclosure may be a transparent touch screen, however, it is not limited thereto.

The touch panel 111 may be placed on the display unit 112. In detail, the touch panel 111 may be implemented as an add-on type disposed in front of the display unit 112, or an on-cell type or an in-cell type that is inserted into the display unit 112. A size of the touch screen 110 may be determined as a size of the touch panel 111. The touch panel 111 may generate an analog signal (e.g., a touch event) in response to a user input information (e.g., a user gesture) corresponding to the touch panel 111, and may deliver the signal to the controller 170 by performing an analog to a digital conversion. Here, the touch event may include touch coordinate (X, Y) information. The controller 170 may determine that the touch means (for example, a finger or a pen) are touched to the touch screen when the touch event is received from the touch screen 110, and may determine that the touch is released when the touch event is not received from the touch screen 110. In addition, when the touch coordinate has been changed, the controller 170 may determine that the touch is moved, and may calculate a position variation of the touch and a movement speed of the touch in response to the touch movement. The controller 170 may divide the user gesture based on the touch coordinate, the touch release, the touch movement, a position variation of the touch, and a movement speed of the touch. The user gesture may include a touch, a multi touch, a tap, a double tap, a long tap, a tap and touch, a drag, a flick, a press, a long press, a pinch in, and a pinch out. In addition, the touch screen may be equipped with a pressure sensor to detect a pressure of a touched point. The detected pressure information may be delivered to the controller, and may divide the touch and a press. A resistive type, a capacitive type, and an electromagnetic induction type may be applied to the touch panel 111.

Under the control of the controller 170, the display unit 112 may display an image data received from the controller 170 after converting into an analog signal. That is, the display unit 112 may provide various screens according to a use of the portable terminal, for example, a lock screen, a home screen, an application (hereinafter, referred to as an APP) execution screen, a menu screen, a keypad screen, a message writing screen, and an interne screen. The display unit 112 may be formed with a type of a Liquid Crystal Display (LCD), an Organic Light Emitted Diode (OLED), an Active Matrix Organic Light Emitted Diode (AMOLED), a Flexible display, and a Transparent display. When the display unit is formed with the transparent display type, the components configuring the display unit, for example, an LCD panel, a polarizing plate, and a backlight unit are all transparent. When the display unit 112 is formed with the flexible type, it may be replaced by a plastic film or a metal foil to which the flexibility has been added.

Under the control of the controller 170, the display unit 112 according to the present disclosure may provide conference call screen interface that arranges and outputs a first image collected from a first camera and a second image collected from a second camera so as not to overlapped when performing the conference call. In addition, under the control of the controller, the display unit 112 according to the present disclosure may display a specific person's image, that is, a speaking person's image is distinguished from another person's image. For example, under the control of the controller, the display unit 112 may display the speaking person's image is distinguished from non-speaking person's image by performing a graphic processing with respect to at least one of an icon, a color, a brightness, or an effect. For example, the speaking person's image may be highlighted by the display unit 112, and the non-speaking person's image may be displayed in gray. In addition, the display unit 112 may output the speaking person's image in a separate display area by extracting a separate image. In particular, the display unit according to the present disclosure may provide the image call screen User Interface (UI) in a landscape mode in order to perform the conference call. The image call screen UI will be described in more detail with reference to FIGS. 4 to 7.

The key input unit 120 may receive number or person information, and may include a plurality of input keys and function keys to set various functions. The function keys may include an arrow key, a side key, and a shortcut key that are set to perform a specific function. In addition, the key input unit 120 may generate a key signal related to a user setting and a function control of the portable terminal 100, and may deliver the key signal to the controller 170. The key signal may be divided into a power on/off signal, a volume control signal, and a screen on/off signal. The controller 170 may control the configurations in response to such key signal. In addition, the key input unit 120 may include a QWERTY keypad, a 3*4 keypad, and a 4*3 keypad that include a plurality of keys. Further, when the touch panel in the portable terminal 100 is supported with a full touch screen type, the key input unit 120 may only include at least one side key for a screen on/off or a portable terminal on/off that are formed in a case side of the portable terminal 100.

The wireless communication unit 130 may perform a communication of the portable terminal. The wireless communication unit 130 may perform the communication such as a voice communication, an image communication, and a data communication by forming a communication channel in which the supportable mobile communication network has been set. The wireless communication unit 130 may include a radio frequency transmission unit which performs up conversion and amplification of a frequency of the transmitted signal, and a reception unit which performs low noise amplification and down conversion of a frequency of a received signal. In addition, the wireless communication unit 130 may include a mobile communication module (e.g., 3-Generation mobile communication module, 3.5-Generation mobile communication module, or 4-Generation mobile communication module, etc.), and a digital broadcasting module (e.g., DMB module).

The audio processing unit 140 may transmit an audio data received from the controller 170 to a Speaker (SPK) by performing Digital to Analog (DA) conversion, and may deliver the audio data received from a microphone (MIC) to the controller 170 by performing Analog to Digital (AD) conversion. The audio processing unit 140 may be configured with a codec (coder/decoder), and the codec may be equipped with a data codec processing a packet data and an audio codec processing an audio signal such as a voice. The audio processing unit 140 may convert the received digital audio signal into the analog signal through the audio codec and replay through the speaker. The audio processing unit 140 may convert the analog audio signal that is inputted from the microphone into the digital audio signal through the audio codec and deliver to the controller 170.

The first camera 150 and the second camera 155 may provide the collected image through a photographing. Here, when one of the first camera 150 and the second camera 155 is disposed on one side of the portable terminal, the other is disposed on the other side. For example, the first camera 150 is a rear camera mounted on a rear side of the portable terminal, and may photograph an image of subject with a high-resolution. On the contrary, the second camera 155 is a front camera mounted on a front of the portable terminal, and may photograph an image of a user of the portable terminal 100 with a low resolution that is relatively low compared to the first camera 150. The first camera 150 and the second camera 155 may be activated to collect the image according to the signal generated from the touch screen 110 or the key input unit 120.

The first camera 150 and the second camera 155 in the present disclosure may include a camera sensor that converts an input optical signal into an electrical signal, an image signal processor that converts an analog image signal photographed from the camera sensor into a digital data, and a digital signal processor that performs an image processing (e.g., a size scaling, a noise elimination, a RCG signal conversion, etc.) for a video signal in order to display a digital data output from the image signal processor on the touch screen. Here, a Charge-Coupled Device (CCD) sensor or a Complementary Metal-Oxide Semiconductor (CMOS) sensor may be used for the camera sensor, and the digital signal processor may be omitted and may be implemented with a DSP.

The storage unit 160 may store various data generated from the portable terminal as well as an Operating System (OS) of the portable terminal 100 and various Applications (App). The data may be generated by using the data generated in the Application execution (App) of the portable terminal and the portable terminal, or may include all types of storable data by receiving from an external (e.g., an external server, other mobile terminal, a personal computer). The storage unit 160 may store the user interface provided from the portable terminal and various setting information corresponding to the portable terminal function processor.

The controller 170 may control the overall operation of the conference call terminal and a signal flow between the internal blocks of the conference call terminal. When the conference call is initiated, the controller 170 may form the conference call screen UI in a landscape mode based on the collected images. When the conference call is initiated, the controller 170 may collect the first image and the second image by operating the first camera 150 and the second camera 155, and may form the conference call screen in which the first image and the second image are arranged as not to overlap. When the other party image is received from the other party portable terminal, the controller 170 may output the other party image by renewing the conference call screen that is currently output based on the other party image and image information.

The controller 170 may extract person's images from the image outputted from the conference call screen, and may perform a function determining a speaking person's image among the plurality of extracted person's images. The controller 170 may highlight the speaking person's image in the conference call screen, or may output the speaking person's with a separate image frame. The controller 170 may process a background image of the first image and the second image to have the identical background image in the conference call screen.

In more detail, the controller 170 includes a speaking person extraction unit 171 and a processing unit 172. The speaking person extraction unit 171 may detect person's images from an output image of the conference call screen by using various detection methods. For example, the detection method may separate person's image from the output image by detecting an outline (edge: i.e., a discontinuous point of pixel brightness) of person's image. Such detection method may be able to separate the background image except for the person as well as person's image.

The speaking person extraction unit 171 may process the output image in gray or a binary, and may detect a face and a lip from the output image by performing a template matching corresponding to the processed image. The speaking person extraction unit 171 may extract a person's image, and may determine the speaking person by using various detection methods. For example, the speaking person extraction unit 171 may determine the speaking person by calculating a variation from the previous frame in a lip area of person's images. The speaking person extraction unit 171 may deliver the determined speaking person information to the processing unit 172.

When the speaking person information is delivered from the speaking person extraction unit, the processing unit 172 may distinguish the output image for the speaking person's image from another person's image, and may deliver the processed image to the display unit 112. For example, the processing unit 172 may extract an image frame part in which the speaking person is output, and may generate a separate speaking person's image, and deliver to the display unit 112. In addition, the processing unit 172 may highlight the image part in which the speaking person is output, or highlight the speaking person's image part, and the non-speaking person's image is grayed, and deliver the processed image to the display unit 112. The processing unit 172 may synthesize the extracted person's image and a specific background image so that the background of the first image and the second image may have an identical background effect, and deliver the synthesized image to the display unit 112.

In addition, the processing unit 172 may synthesize the first image and the second image collected from the first camera 150 and the second camera 155 not to be overlapped, and may transmit the synthesized image to the other party terminal.

Furthermore, the portable terminal according to the present disclosure may support for a screen display by a landscape mode, a screen display by a portrait mode, and an adaptive screen conversion display according to a change between the landscape mode and the portrait mode according to a rotation direction (or orientation) of the portable terminal when displaying the conference call screen.

Since the variation is so diverse according to the trend of digital convergence, it is impossible to enumerate all, however, the portable terminal 100 according to the present disclosure may further include the configurations which are not mentioned above such as a sensor module to detect information related to a position change of the portable terminal, a Global Positioning System (GPS) module to measure a position of the portable terminal, and a camera module. In addition, specific configurations in the portable terminal 100 may be excluded from the above described configuration, or may be replaced with other configuration depending on its providing type. Further, the input unit in the present disclosure may be a touch pad and a trackball as well as the touch screen 110 and the key input unit 120.

In performing an image call, both the transmission side terminal and the reception side terminal are applicable to the portable terminal according to an embodiment of the present disclosure. That is, when the conference call is initiated, the portable terminal according to the present disclosure may transmit the first image and the second image collected from the first camera and the second camera to the other party terminal, or may transmit the synthesized image in which the first image and the second image are arranged not to overlapped to the other party terminal. On the contrary to this, the portable terminal may receive the synthesized image in which the image is arranged not to overlap from the other party terminal. The portable terminal may configure the conference call screen UI with various types based on the images collected from the cameras and the images received from the other party terminal. In particular, the conference call screen UI according to an embodiment of the present disclosure may be set to output in landscape mode, however, it is not limited thereto. In addition, the portable terminal according to the present disclosure may determine the speaking person in the conference image, and may configure the screen UI to output the speaking person differently from the other persons.

For the convenience of the description, the method for operating the screen UI during the image call will be described based on the transmission side terminal, however, a method and an apparatus for operating UI according to the present disclosure are not limited thereto, and may be the portable terminal which can implement all configurations according to an embodiment of the present disclosure.

Figure 2:
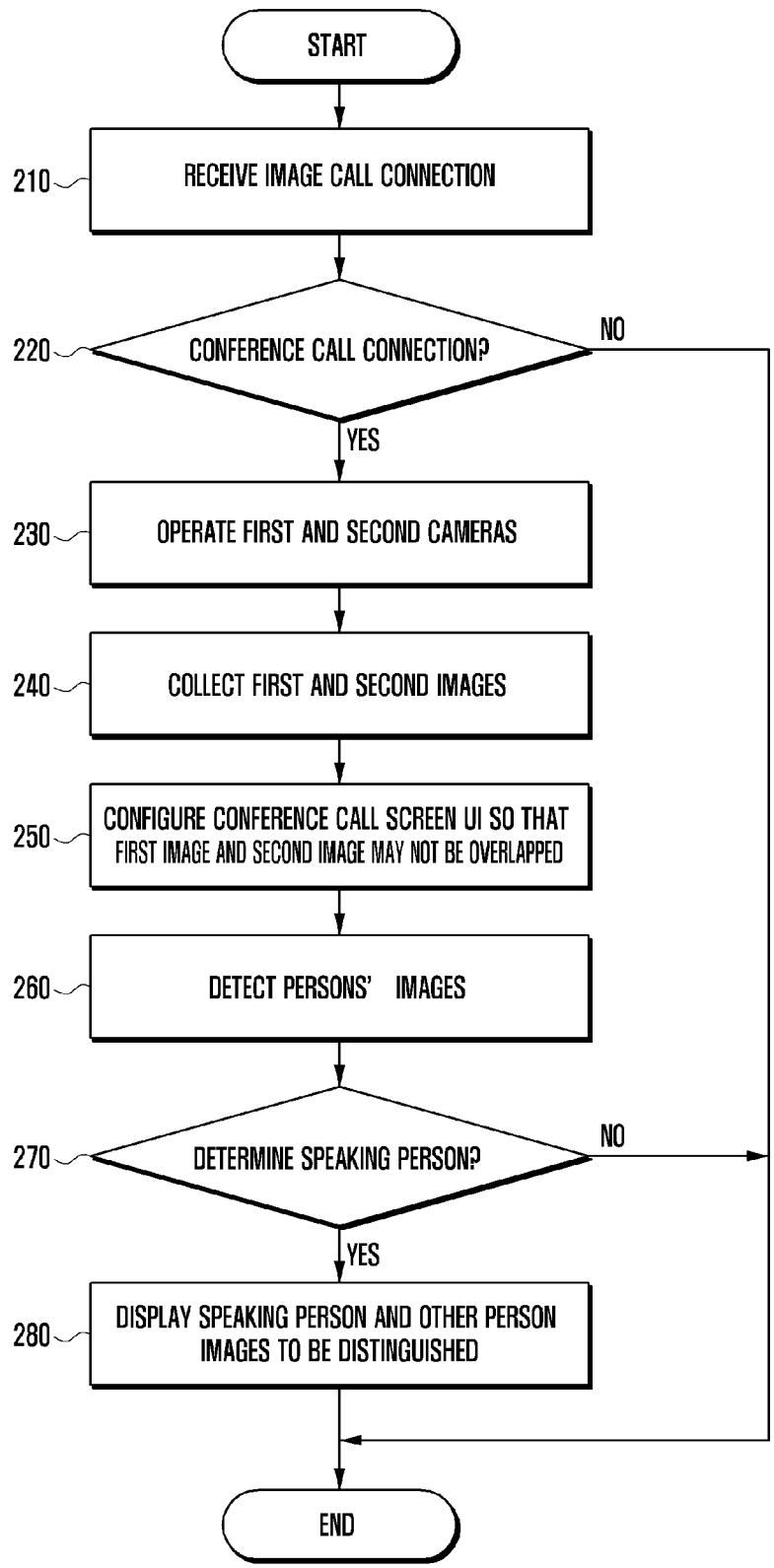
FIG. 2 is a flowchart illustrating a method of operating a User Interface (UI) of a conference call terminal according to an embodiment of the present disclosure.

FIG. 2 is a flowchart illustrating a method of operating a UI of a conference call terminal according to an embodiment of the present disclosure.

Referring to FIG. 2, the controller 170 may receive image call connection at operation 210. In this operation, a user terminal (e.g., a transmission side) may request for the image call connection to the other party terminal (e.g., a reception side), or may receive a call connection request from the other party terminal.

The controller 170 may receive a response signal that allows the call connection from the other party's terminal, or the conference call may be connected to the other party portable terminal when allowing the call connection request of the other party terminal.

At operation 220, the controller 170 may determine whether the image call connection is the conference call connection request. For example, the portable terminal according to an embodiment of the present disclosure may provide an option menu requesting the conference call connection. When the user selects the conference call connection menu in a call function of the portable terminal, the controller 170 may receive the conference call connection request event. Otherwise, when the user does not select the conference call connection menu in a call function of the portable terminal, the controller 170 ends processing.

At operation 230, when the conference call connection request event is received, the controller 170 may operate the first camera 150 and the second camera 155. Here, the first camera 150 and the second camera 155 may be a front camera and a rear camera mounted in the user terminal. Meanwhile, when the request event for a normal image call instead of the conference call connection is received, the controller 170 may operate only one of the first camera 150 and the second camera 155.

At operation 240, the controller 170 may collect the first image and the second image photographed from the first camera 150 and the second camera 155. At the same time, the controller 170 may collect a voice signal received through a microphone.

For example, for the conference call, when there are three persons in a front direction of the user terminal, and three persons in a rear direction of the user terminal respectively, the controller 170 may collect the first image of the persons in the front direction through the first camera 150, and may collect the second image of the persons in the rear direction through the second camera 155.

The controller 170 may generate the first image data based on the first image collected through the first camera, and may generate the second image data based on the second image collected through the second camera. The controller 170 may add the output position information to the first image data and the second image data so that the images may not be overlapped. The output position information refers to the information of position in which the first image and the second image are outputted in the conference call screen UI. In addition, the controller 170 may generate the synthesized image data by arranging the first image and the second image as the combined image outputted in the conference call screen. The controller 170 may compress and decodes the generated first image data and the second image data respectively, or may transmit to the other party terminal by compressing and decoding the synthesized image data. The controller 170 may collect the other party image from the other party's terminal when receiving a response signal that permits the call connection from the other party terminal, or when the image call are connected with the other party's portable terminal by permitting the call connection request of the other party terminal.

At operation 250, the controller 170 may output the conference call screen UI based on the collected images. The controller 170 may configure the conference call screen UI so that the first image and the second image may be not overlapped. In particular, the portable terminal according to an embodiment of the present disclosure may be set in such a manner that the first image and the second image are output in the landscape mode, however, it is not limited thereto. Here, the conference call screen UI will be described later in detail with reference to FIGS. 3 to 7.

When the other party image is received from the other party terminal, the controller 170 may output the other party image information and the other party image based on the other party's image information on the conference call screen. In this case, the controller 170 may receive the synthesized image form the other party terminal, or may receive two of the other party images and the output position information.

At operation 260, the controller 170 may detect person's images from an output image of the conference call screen. For example, the controller 170 may separate person's images from the output image by detecting an outline (edge: i.e., a discontinuous point of pixel brightness) of person's images. Here, the controller may separate the background image excluding the person as well as person's images.

At operation 270, the controller 170 may determine whether the speaking person exists in the detected person's image. For example, the controller 170 may determine the speaking person by calculating the variation from the previous frame in the lip area of the speaking persons. Otherwise, if the controller 170 does not determine the speaking person, the controller 170 may end processing.

At operation 280, the controller 170 extracts person's image information and graphic-processes at least one of an icon, a color, a brightness, or an effect on the conference call screen in such a manner that the speaking person's image and the non-speaking person's image may be distinguished, thereby outputting the speaking person and other person differently.

For example, the controller 170 may extract an image frame part in which the speaking person is outputted, generates a separate speaking person's image, and may deliver this image to the display unit 112. The controller 170 may renew the conference call screen so that the separate speaking person's image is output on the display unit. In addition, the controller 170 may process the image part in which the speaking person is highlighted, and process other person's image part in gray, and may deliver the processed image to the display unit 112. The controller 170 may synthesize the extracted person's image and the specific background image so that the background image of the first image and the second image may have the identical background effect, and may deliver the synthesized image to the display unit 112.

According to the present disclosure, by operating the first camera and the second camera when performing the conference call, relatively more persons can participate in the conference call than performing the conference call by using only single camera.

FIG. 3 illustrates a conference call screen UI according to one embodiment of the present disclosure.

Referring to FIG. 3, when the conference call is initiated, as illustrated in screen 301, the controller 170 may output the conference call screen UI on the display unit 112. Here, the conference call screen UI may be set to output in landscape mode, however, it is not limited thereto.

To this end, the controller 170 may output a message (e.g., please position device in landscape mode) or an icon (e.g., ↓↓↓) instructing to position the portable terminal in the landscape mode, on the display unit, however, it is just an example, and is not limited thereto. The conference call screen 310 may be configured with various types according to the images collected for the image call, that is, the image collected from the user terminal and the frame ratio and position information of the image collected from the other party terminal.

The conference call screen 310 in screen 301 may include a user display area 320 and the other party display area 330. In addition, although not shown in drawings, the conference call screen may include a function menu (e.g., a function of converting into a normal image call, and a mute function, etc.) area related to the image call, but is not limited thereto. In case of the conference call screen 310 in the landscape mode, the user display area 320 and the other party display area 330 may be arranged in an up and down arrangement. For the convenience of the description, the user display area is illustrated as disposed in the upper part in screen 301, however, it is not limited thereto.

The user display area 320 is arranged according to a pre-defined setting so that the first image 321 and the second image collected from the first camera and the second camera may not be overlapped. The output size of the user display area 320 may be changed according to the number of the collected image. That is, the controller 170 may set the user display area with two image output sizes, and may output the first image 321 in a left side area of the user display area 320, the second image 322 in right side area respectively. In this case, the controller 170 may generate and store the output position information of the first image and the second image. A dotted line of the user display area has been illustrated for the convenience of the description, and may not be applied to the portable terminal having the configuration of the present disclosure.

The other party image received from the other party terminal is output in the other party display area 330. At this time, the output size of the other party display area 330 may be changed according to the frame ratio and the number of the other party image.

For example, as illustrated in 301, the controller 170 may output the other party image by setting the other party display area 330 with one image output size when the output frame ratio received from the other party terminal is 4:3. Meanwhile, when the output frame ratio of the image received from the other party' terminal is 8:3, the controller 170 may output the other party image by setting the other party display area 330 with two image output sizes.

Screen 302 is a view of the conference call screen when the user display area and the other party display area are set with two image output sizes.

For example, when the image received in the procedure of processing the other party image received from the other party terminal is two or one synthesized image (e.g., the output frame ratio is 8:3), the controller 170 may output the other party image by setting the other party display area with two image output sizes. As illustrated in 302, when the image received from the other party terminal is two, the controller 170 may arrange and output the two received images 331, 332 not to overlap, as if to output the image in the user display area. When two images are received from the other party terminal, the controller 170 may verify output position information of each image, and may output two image frames not to overlap. For example, the controller 170 may output one image 331 in the left side of the other party display area 330 based on output position information among two images received from the other party terminal, and may output the other image 332 in the right side.

As described above, the conference call terminal according to the present disclosure may configure the screen UI according to the number and the ratio of the image received from the other party terminal as well as the image collected from the user terminal. In addition, the conference call terminal may transmit the screen configuration information according to the screen UI configuration to the other party terminal. That is, the conference call terminal may transmit the first image and the second image to the other party terminal respectively, or may transmit the synthesized image in which the first image and the second image are arranged not to overlap to the other party terminal. Accordingly, the other party terminal may also perform the conference call with the screen UI configuration identical to the described screen UI.

By operating the first camera and the second camera, the conference call terminal according to the present disclosure may enable relatively more persons to participate in the conference call than performing the image call by using only single camera.

Figure 4:
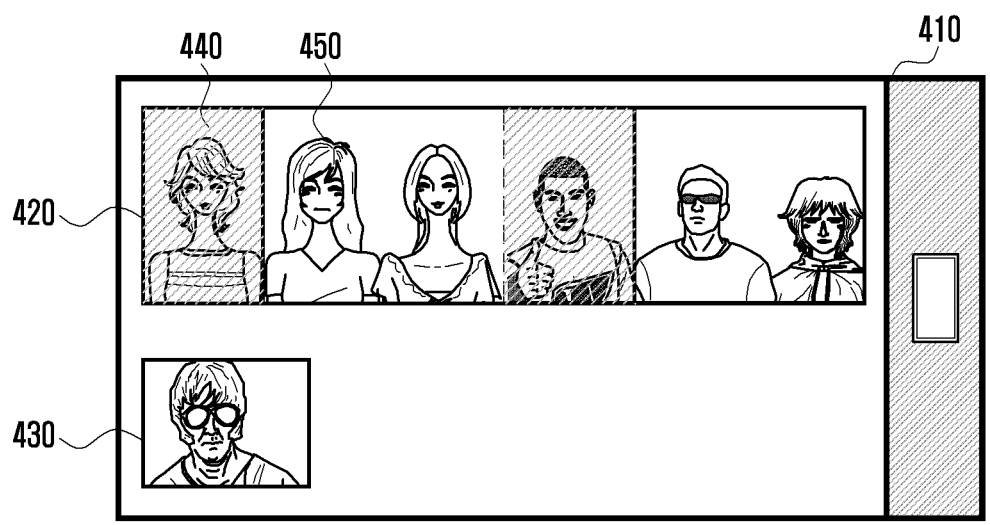
FIG. 4 illustrates a speaking person display method according to one embodiment of the present disclosure.

FIG. 4 illustrates a speaking person display method according to one embodiment of the present disclosure.

Referring to FIG. 4, the conference call screen may be output with an image effect of various types according to the image information. To this end, the controller 170 may extract image information included in the image, and, if a specific person is determined as the speaking person from person's image information, the controller 170 may graphic process at least one of an icon, a color, a brightness, or an effect so that the speaking person's image may be distinguished from other person's image. For example, the controller 170 may highlight the person's image, and may gray the other person's image.

In particular, when the conference call is initiated, the controller 170 may configure the conference call screen 410 including the user display area 420 and the other party display area 430, and may detect a person's image from the output images. The controller 170 may determine whether the detected persons are the speaking persons. Here, the controller 170 may extract only one person's image from the output image, and may determine the speaking person by using voice feature information of the person, movement information of a lip, movement information of a face, and specific gesture information of the persons.

For example, the controller 170 may extract only person's image from the output image (i.e., the user image and the other party image), and may extract each person's face and lip area by using face color information and shape information of the person. In addition, the controller 170 may determine the speaking person by calculating the variation amount from the previous frame in the lip area. The configuration of determining the speaking person has been described for the convenience of the present disclosure, and is not limited thereto.

Figure 5:
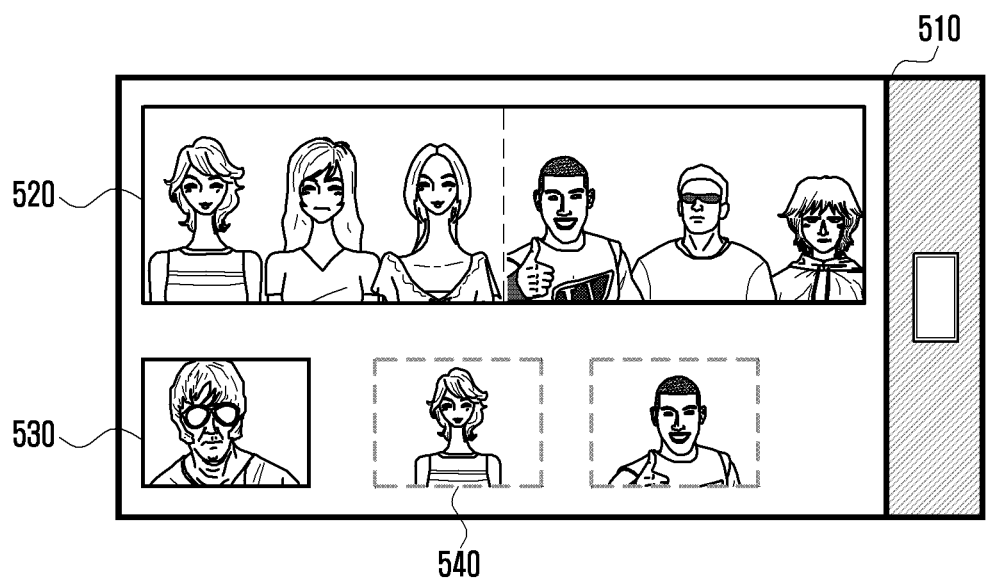
FIG. 5 illustrates a speaking person display method according to another embodiment of the present disclosure.

When it is determined that the speaking person exists in the output image, the controller 170 may divide the output image into a speaking person area 440 and non-speaking person area 450, and may highlight the speaking person area 440 by processing the output image as illustrated in FIG. 5.

In addition, the controller 170 may highlight the speaking person area 440, and may gray the non-speaking person area 450, and also may output an arrow-shaped mark (e.g., a graphic processing such as a flickering point and an icon of a polygon shape, etc.) on the speaking person area 440. Thus, the user may distinguish intuitively who is the speaking person among a plurality of persons outputted from the conference call screen.

FIG. 5 illustrates a speaking person display method according to another embodiment of the present disclosure.

Referring to FIG. 5, in a conference call screen 510 that includes a user display area 520 and the other party display area 530, the image of the speaking person among a plurality of persons participate in the image call is output in the bottom of the screen as a separate image 540. When the conference call is initiated, the controller 170 may configure the conference call screen 510, and may detect person's image from the output image (i.e., the other party image and the user image). When it is determined that the speaking person exists in the detected person's images, the controller 170 may extract only the image part of the speaking person area corresponding to each frame among the output image. The controller 170 may output the 'image of the extracted speaking person 540 in the bottom part of the conference call screen.

Figure 6:
FIG. 6 illustrates a conference call screen UI of a portable terminal according to another embodiment of the present disclosure.

FIG. 6 illustrates a conference call screen UI of a portable terminal according to another embodiment of the present disclosure.

Referring to FIG. 6, the conference call screen 610 may be output in such a manner that each of the collected two images has the same background image effect 650. For example, since the first image and the second image configuring the conference call screen 610 are the images collected from a front camera and a rear camera that are provided in the portable terminal, the background image of the first image and the second image may be different. The controller 170 may extract person's images (e.g., the speaking person area 640) and the background images from the first image and the second image, and may output the synthesized image in which the extracted person's images are synthesized with one of the specific background image on the user display area 620. According to the pre-defined setting, the specific background image 650 may be any one of the background images provided from the portable terminal or the background image extracted from the output image according to the user selection. For example, the controller 170 may select the background image 650 of the first image among the background image extracted from the first image and the second image, and may control to output by synthesizing person's image of the second image and the background image of the first image.

In the conference call screen 610, the other party image received from the other party terminal is output in the other party display area 630. Here, the output size of the image in the other party display area may be changed according to the number of the received other party image and the frame ratio.

Figure 7:
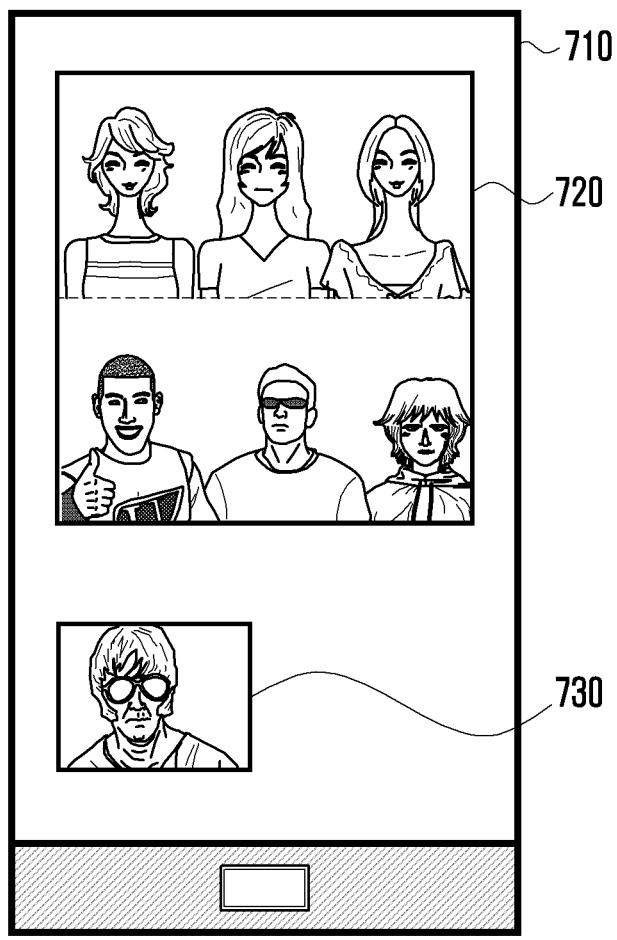
FIG. 7 illustrates a conference call screen UI of a portable terminal according to still another embodiment of the present disclosure.

FIG. 7 illustrates a conference call screen UI of a portable terminal according to still another embodiment of the present disclosure.

Referring to FIG. 7, when the conference call is initiated, the controller may output the conference call screen UI in a portrait mode on the display unit as illustrated in FIG. 7. The conference call screen 710 may include the user display area 720 and the other party display area 730.

In the conference call screen 710 in the portrait mode, the user display area 720 may be arranged with an up and down arrangement so that the first image and the second image collected from the first camera 150 and the second camera 155 may not be overlapped according to the pre-defined setting. The conference call screen 710 in the portrait mode may be output with an image effect of various image types according to the image. For example, the conference call screen 710 in the portrait mode may process and highlight the speaking person area, or may change the background image of the first image and the second image to be identical.

In the conference call screen 710, the other party image received from the other party terminal may be output on the other party display area 730. The output size of the image in the other party display area may be changed according to the number of the received other party image and the frame ratio. For example, when two images are received from the other party terminal, or the image in which two images are synthesized with an up and down arrangement is received, it may be arranged with the up and down arrangement so that two images are not overlapped similarly to the user display area.

The present disclosure may collect an image of a plurality of persons through a front camera and a rear camera during a conference call, and may distinguish a speaking person in the collected image from other persons.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood that by those skilled in the art that various changes in form and details may be made therein without departing from the spirit and scope of the present disclosure as defined by the appended claims and their equivalents.

What is claimed is:

1. A method for operating a user interface of a conference call terminal, the method comprising:
   operating a first camera and a second camera when a conference call with another party's terminal is connected;
   collecting a first image from the first camera, a second image from the second camera and another party's image from the other party's terminal;
   displaying simultaneously the first image, and the second image and the party image on a conference call screen, the first image and the second image and the other party's image being arranged so as to not overlap;
   displaying a speaking person's image distinguishably from another person's image, when the speaking person's image of the images displayed on the conference call screen is detected;
   extracting an image part of the speaking person's image; and
   displaying separately the extracted image part on a portion of the conference call screen,
   wherein the displaying of the speaking person's image distinguishably from the another person's image comprises:
      separating and extracting a frame area of the speaking person's image and the another person's image, and highlighting the frame area of the speaking person's image, and graying the frame area of the another person's image.

2. The method of claim 1, wherein the outputting of the output image of the conference call screen comprises:
outputting the output image of the conference call screen, the output image comprising (i) a user display area including the first image and the second image, and (ii) another party display area including the other party's image received from the other party's terminal,
wherein the user display area and the other party display area are arranged one over the other and not to overlap.

3. The method of claim 1, wherein the outputting of the output image of the conference call screen comprises outputting the conference call screen in a landscape mode.

4. The method of claim 1, wherein the outputting of the output image of the conference call comprises:
separating and extracting images of persons and background images from the first image and the second image;
synthesizing the extracted images of persons with one background image; and
outputting the synthesized first and second images.

5. The method of claim 1, wherein the displaying of the speaking person's image distinguishably from the another person's image comprises:
graphic-processing and outputting at least one of an icon, a color, a brightness, and an effect with respect to the frame area of the speaking person's image and the another person's image.

6. The method of claim 1, wherein the distinguishing of the speaking person's image from the another person's image comprises:
separating and extracting a frame area of the speaking person's image and the another person's image;
generating the speaking person's image consisting of the extracted speaking person's image; and
outputting the generated speaking person's image in a specific area of the conference call screen.

7. A conference call terminal comprising:
a first camera and a second camera configured to obtain and collect an image;
a microphone and speaker configured to collect and output an audio signal;
a transceiver configured to transmit and receive an image and a voice signal;
a processor configured to:
collect a first image and a second image by operating a first camera and a second camera when a conference call with another party's terminal is connected, and control a display unit to:
display simultaneously the first image, the second image and the party image on a conference call screen, the first image and the second image and the party image being arranged so as to not overlap, and
display a speaking person's image distinguishably from the images displayed on the conference call screen,
extract an image part of the speaking person's image, and
display separately the extracted image part on a portion of the conference call screen,
wherein the processor further controls the display unit to:
separate and extract a frame area of the speaking person's image and the another person's image, and output the conference call screen in which the frame area of the speaking person's image is highlighted, and the frame area of the another person's image is grayed.

8. The apparatus of claim 7, wherein the processor further comprises:
a speaking person extraction unit configured to extract a person's image by detecting an outline of a person's image from the output image of the conference call screen, and determine a speaking person from person's images; and
a processing unit configured to process the output image so that the speaking person's image may be distinguished from the another person's image, when the speaking person is determined.

9. The apparatus of claim 7, wherein the display unit outputs the conference call screen in which person's images of the first image and the second image and one background image are synthesized.

10. The apparatus of claim 7, wherein the display unit outputs the conference call screen in which a frame area of the speaking person's image is highlighted.

11. The apparatus of claim 7, wherein the display unit graphic-processes and outputs at least one of an icon, a color, a brightness, and an effect with respect to the frame area of the speaking person's image and the another person's image.

12. The apparatus of claim 7, wherein the display unit outputs the speaking person's image in a specific area of the conference call screen.

13. A method of operating a user interface of a conference call terminal, the method comprising:
creating an output image comprising (i) a first image received from a first image device and a second image received from a second image device, the first image and the second image abutting each other on a first parallel plane, and (ii) another party's image received from another conference call terminal on a second parallel plane, the first image and the second image and the other party's image being arranged so as to not overlap;
displaying the output image on a conference call screen of the conference call terminal;
displaying an image of at least one person speaking in the output image distinguishably from an image of at least one person being quiet;
extracting an image part of the at least one person speaking; and
displaying separately the extracted image part on a portion of the conference call screen,
wherein the displaying of the image of the at least one person speaking distinguishably from the image of at least one person being quiet comprises:
separating and extracting a frame area of the image of the at least one person speaking and the image of at least one person being quiet, and
highlighting the frame area of the image the at least one person speaking, and graying the frame area of the image of at least one person being quiet.

14. The method of claim 13, wherein the output image is displayed in a landscape mode on the conference call screen of the conference call terminal.

15. A non-transitory computer-readable storage medium storing instructions that, when executed, cause at least one processor to perform the method of claim 13.

* * * * *